US010189574B2

(12) United States Patent
Zhou et al.

(10) Patent No.: US 10,189,574 B2
(45) Date of Patent: Jan. 29, 2019

(54) ELECTRIC VEHICLE PROPULSION SYSTEMS AND METHODS OF ASSEMBLING THE SAME

(71) Applicant: General Electric Company, Schenectady, NY (US)

(72) Inventors: Rui Zhou, Niskayuna, NY (US); Hao Huang, Troy, OH (US); Manoj Ramprasad Shah, Latham, NY (US); Dong Dong, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 314 days.

(21) Appl. No.: 14/965,359

(22) Filed: Dec. 10, 2015

(65) Prior Publication Data

US 2017/0166316 A1   Jun. 15, 2017

(51) Int. Cl.
| | |
|---|---|
| *B60L 9/00* | (2006.01) |
| *B64D 27/24* | (2006.01) |
| *B60L 11/12* | (2006.01) |
| *H02M 7/49* | (2007.01) |
| *B60L 15/20* | (2006.01) |

(Continued)

(52) U.S. Cl.
CPC ............ *B64D 27/24* (2013.01); *B60L 11/123* (2013.01); *B60L 15/20* (2013.01); *H02M 7/49* (2013.01); *B60L 2200/10* (2013.01); *B60L 2210/30* (2013.01); *B60Y 2200/92* (2013.01); *B64D 2027/026* (2013.01); *B64D 2221/00* (2013.01); *H02M 2007/4835* (2013.01); *Y02T 50/44* (2013.01); *Y02T 50/64* (2013.01); *Y10S 903/903* (2013.01)

(58) Field of Classification Search
CPC ......... B64D 27/24; B60L 11/123; B60L 15/20
See application file for complete search history.

(56) References Cited

U.S. PATENT DOCUMENTS

| | | |
|---|---|---|
| 7,701,082 B2 | 4/2010 | Lazarovich et al. |
| 8,218,341 B2 | 7/2012 | Wiegman et al. |
| 8,575,778 B2 | 11/2013 | Chen |

(Continued)

FOREIGN PATENT DOCUMENTS

| | | |
|---|---|---|
| WO | 2014158240 A2 | 10/2014 |
| WO | 2015034517 A1 | 3/2015 |

OTHER PUBLICATIONS

Jiang et al., "Flexible multiobjective control of power converter in active hybrid fuel cell/battery power sources", Power Electronics, IEEE Transactions on, vol. 20, Issue: 1, pp. 244-253, Jan. 2005.

(Continued)

*Primary Examiner* — Adam M Alharbi
(74) *Attorney, Agent, or Firm* — GE Global Patent Operation; Nitin Joshi

(57) ABSTRACT

An electrical propulsion system for a vehicle. The electrical propulsion system includes at least one generator. The electrical propulsion system also includes at least one drive engine coupled to the at least one generator. The electrical propulsion system further includes at least one electrical device and at least one battery integrated power converter (BIC). The at least one generator and at least one of the at least one BIC and the at least one electrical device are coupled. The at least one BIC and the at least one electrical device are coupled.

17 Claims, 13 Drawing Sheets

(51) Int. Cl.
*B64D 27/02* (2006.01)
*H02M 7/483* (2007.01)

(56) References Cited

U.S. PATENT DOCUMENTS

| | | | |
|---|---|---|---|
| 8,791,589 | B2 | 7/2014 | Colello et al. |
| 8,792,253 | B2 | 7/2014 | Wang et al. |
| 8,924,269 | B2 * | 12/2014 | Seubert .................. G06Q 10/06 705/35 |
| 8,944,367 | B2 | 2/2015 | Bystry, Jr. et al. |
| 9,007,020 | B2 | 4/2015 | Prosser et al. |
| 9,013,066 | B2 | 4/2015 | Kojori et al. |
| 9,071,141 | B2 | 6/2015 | Dong et al. |
| 9,702,349 | B2 * | 7/2017 | Anderson .................. F03G 7/08 |
| 9,873,196 | B2 * | 1/2018 | Szatmary .................. B25J 5/00 |
| 2012/0248866 | A1 | 10/2012 | Takeuchi et al. |
| 2013/0307324 | A1 | 11/2013 | Johannsen et al. |
| 2013/0310994 | A1 | 11/2013 | Schroeter |
| 2014/0117770 | A1 | 5/2014 | Emadi et al. |
| 2014/0333127 | A1 | 11/2014 | Edwards |
| 2015/0108844 | A1 | 4/2015 | Zhou et al. |
| 2015/0138859 | A1 | 5/2015 | Zhou et al. |

OTHER PUBLICATIONS

Lacressonniere F. et al., "Experimental validation of a hybrid emergency network with low and medium voltage Li-Ion batteries for more electrical aircraft",Power Electronics and Applications (EPE), 2013 15th European Conference on, pp. 1-9, Sep. 2-6, 2013, Lille.

Tan Boxue et al., "Development of a Novel Large Capacity Charger for Aircraft Battery", Intelligent Computation Technology and Automation (ICICTA), 2010 International Conference on, pp. 90-93,vol. 2, May 11-12, 2010, Changsha.

Hoadley, R., "Using a Synchronous Converter for Harmonic Mitigation with AC Drives," Oct. 1, 2003, (10 pgs.). Retrieved from website http://literature.rockwellautomation.com/idc/groups/literature/documents/wp/drives-wp017_-en-p.pdf.

Product information, "From Modules Off the Shelf to Customized Power Conversion Solutions," retrieved on Oct. 14, 2015 from website http://www.convergy-powerconverter.com/from-modules-off-the-shelf-to-customized-power-conversion-solutions_369_1.html.

Solanki, J. et al., "A Completely Modular Power Converter for High-Power High-Current DC Applications," Industrial Electronics Society, IECON 2013—39th Annual Conference of the IEEE, Nov. 10-13, 2013, Vienna, pp. 151-156, retrieved from website http://ieeexplore.ieee.org/xpl/articleDetails.jsp?arnumber=6699127.

Solanki, J. et al., "A Modular Multilevel Converter Based High-Power High-Current Power Supply," 2013 IEEE International Conference on Industrial Technology (ICIT), IEEE, Feb. 25-28, 2013, Cape Town, South Africa, pp. 444-450. Retrieved from website http://wwwlea.uni-paderborn.de/fileadmin/Elektrotechnik/AG-LEA/forschung/veroeffentlichungen/2013/2013_Solanki_ICIT.pdf.

Huang, H., "Challenges in Electrical Power Systems for More Electric Aircraft (MEA);" GE Aviation Systems LLC, Mar. 16, 2015. Retrieved from websites http://www.apec-conf.org/wp-content/uploads/2015APEC_Plenary_HaoHuang.pdf and http://www.apec-conf.org/wp-content/uploads/Speaker1_Hao_Huang.pdf.

Dong, D., "Ac-dc Bus-interface Bi-directional Converters in Renewable Energy Systems," Virginia Polytechnic Institute and State University, Jul. 25, 2012, pp. i-250, Blacksburg, Virginia. Retrieved from http://scholar.lib.vt.edu/theses/available/etd-08022012-151006/unrestricted/Dong_D_D_2012.pdf.

\* cited by examiner

ELECTRIC VEHICLE PROPULSION SYSTEMS AND METHODS OF ASSEMBLING THE SAME

BACKGROUND

The field of the disclosure relates generally to power converters, and, more specifically, to battery integrated power converters for hybrid-electric or all-electric vehicle propulsion systems.

In large vehicles, such as aircraft, utilizing hybrid-electric or all-electric propulsion systems, the weight and performance of components such as energy storage devices and power converters are among the main determining factors of the overall specific power, i.e., kilowatts per kilogram (kW/kg), of the power system. To improve performance of propulsion systems, the specific power values of known power converters, electric motors, cables, as well as circuit protection components for hybrid-electric or all-electric vehicle propulsion must be increased. Also, known power converters for hybrid-electric or all-electric vehicle propulsion systems need to reliably supply power to critical propulsion equipment at all times, without being impacted whatsoever by power needs or electrical faults in accessory systems. In such known power converters for hybrid-electric or all-electric vehicle propulsion systems, interrupting power to the least number of electrical load components as possible is problematic and often results in diminished performance of the main propulsion system due to faults in individual non-propulsion accessory equipment.

At least some known power converters for hybrid-electric or all-electric vehicle propulsion systems utilize the modular multi-level converter (MMC) architecture. Controllers for MMCs in such known power converters for hybrid-electric or all-electric vehicle propulsion systems must not only switch the MMC submodules, including those with insulated-gate bipolar transistors (IGBTs) or metal-oxide semiconductor field-effect transistors (MOSFETs), they must also implement complex control algorithms with sophisticated high speed computing and communications to continually balance the voltages of each submodule capacitor. The MMCs of such known power converters for hybrid-electric or all-electric vehicle propulsion systems utilize large energy storage capacitors on each MMC valve submodule as independently controllable two-level converters and voltage sources for AC or DC electrical loads. Many of these known power converters for hybrid-electric or all-electric vehicle propulsion systems utilize heavy and bulky passive components, e.g., capacitors and inductors, amounting to more than half of their weight.

BRIEF DESCRIPTION

In one aspect, an electrical propulsion system for a vehicle is provided. The electrical propulsion system includes at least one generator. The electrical propulsion system also includes at least one drive engine coupled to the at least one generator. The electrical propulsion system further includes at least one electrical device and at least one battery integrated power converter (BIC). The at least one generator and at least one of the at least one BIC and the at least one electrical device are coupled. The at least one BIC and the at least one electrical device are coupled.

In another aspect, a BIC is provided. The BIC includes at least one string including a plurality of BIC modules (BICMs) coupled to each other. Each BICM of the plurality of BICMs includes a first switching device and a second switching device, where each of the first switching device and the second switching device includes an antiparallel diode coupled in parallel thereto. A first node is defined between the first switching device and the second switching. The BIC also includes a second node coupled to the second switching device. The BIC further includes at least one energy storage device coupled in parallel across the first switching device and the second switching device. The BIC also includes at least one bypass switch coupled to and between the first node and the second node.

In a further aspect, a method of assembling an electric propulsion system for a vehicle is provided. The method includes coupling at least one generator to the vehicle. The method also includes coupling at least one drive engine to the at least one generator. The method further includes coupling at least one BIC to the vehicle. The method also includes coupling at least one electrical device to the vehicle. The method further includes coupling the at least one generator to at least one of the at least one BIC and the at least one electrical device. The method also includes coupling the at least one BIC to the at least one electrical device.

DRAWINGS

These and other features, aspects, and advantages of the present disclosure will become better understood when the following detailed description is read with reference to the accompanying drawings in which like characters represent like parts throughout the drawings, wherein.

Figure 1:
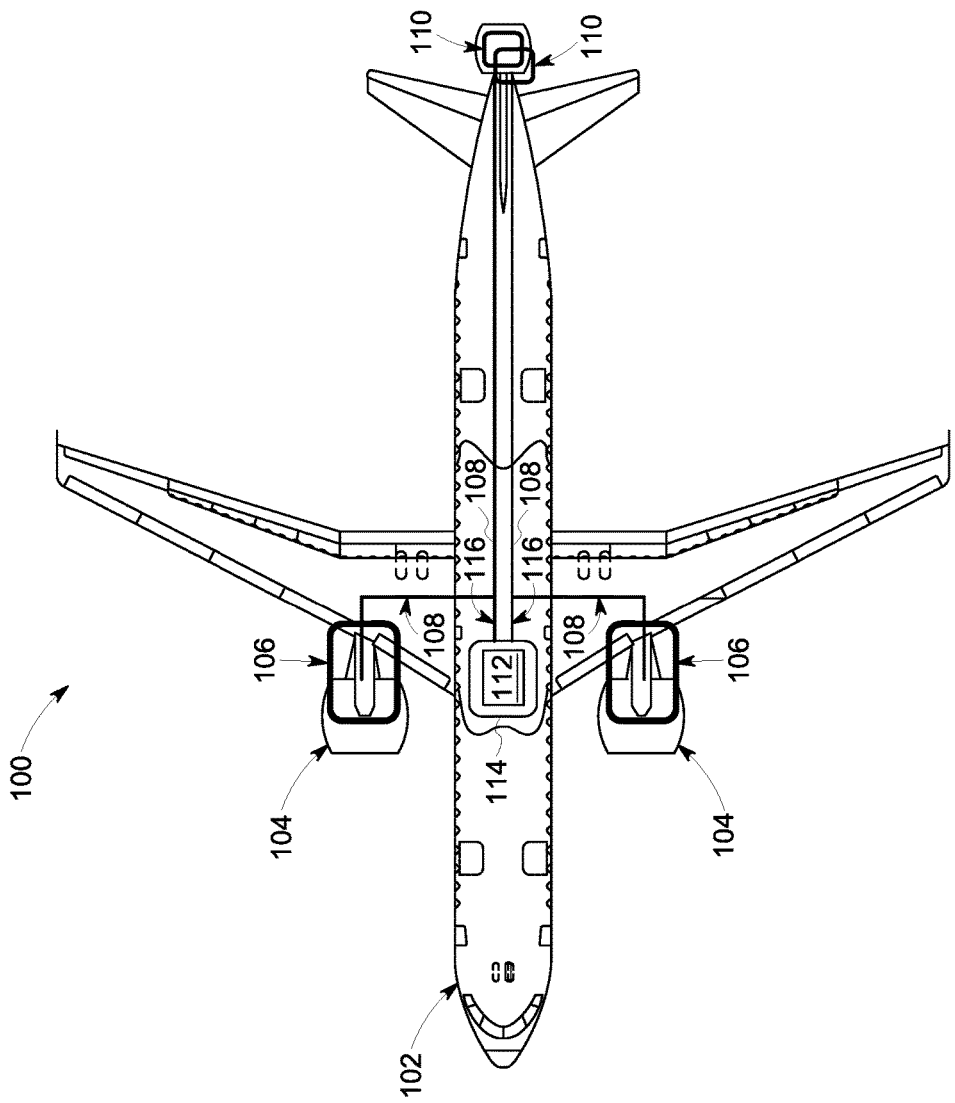
FIG. 1 is a generalized schematic view of a generalized electric vehicle propulsion system superimposed on a plan view of an aircraft.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified by and include all the sub-ranges contained therein unless context or language indicates otherwise.

The battery integrated power converters (BICs) described herein facilitate increasing the specific power, i.e., kilowatt/kilogram (kW/kg), of electric vehicle propulsion systems by reducing the number and weight of passive components and cables. Specifically, the BICs described herein do not require a large number of passive filtering capacitors because the rates of change of voltage with time, i.e., dv/dt, of individual battery integrated power converter modules (BICMs) are reduced relative to known power converters for electric vehicle propulsion systems. Further, specifically, tight control of dv/dt in individual BICMs results in low levels of harmonic distortion and electromagnetic interference (EMI) relative to known power converters for electric vehicle propulsion systems. Further, such BICs are more modular, sealable, reliable, as well as easier to maintain and manufacture relative to known power converters for electric vehicle propulsion systems. Furthermore, a wide variety of energy storage devices are adaptable to use with the BICs described herein, which facilitates incorporation of more advanced energy storage devices into electric vehicle propulsion systems without replacement of power converter components. As such, the BICs described herein utilize energy storage devices to not only provide energy for electric vehicle propulsion, but also to act as voltage sources to enable multi-level power converter operations without additional film capacitors. The BICs described herein also reduce the requirements of using filtering component elements relative to known power converters for electric vehicle propulsion systems.

FIG. 1 is a generalized schematic view of a generalized electric vehicle propulsion system superimposed on a plan view of an aircraft. Prior art electric vehicle propulsion system 100 for a vehicle 102, including, without limitation, an aircraft, includes at least one engine 104, including, without limitation, an internal combustion engine, coupled to vehicle 102. At least one generator 106 is coupled to engine 104 and to vehicle 102. Engine 104 functions as a prime mover, i.e., a drive engine including, without limitation, an aircraft engine, for generator 106 to provide rotary motive force to turn the rotor of generator 106 to induce an alternating current (AC) in a stator of generator 106. AC current is transmitted through at least one generator AC cable 108 from generator 106 to at least one electrical device 110 coupled to vehicle 102. At least one energy storage device 112 is also coupled to vehicle 102.

In some embodiments of prior art electric vehicle propulsion systems, energy storage device 112 includes direct current (DC) energy storage devices such as at least one battery and is collocated with at least one bi-directional DC-to-AC power converter 114 coupled to electrical device 110. Bi-directional DC-to-AC power converter 114 is coupled to generator AC cable 108 through at least one AC converter cable 116. AC power is supplied to electrical device 110 through generator AC cable 108 from generator 106 alone or in combination with AC power supplied by bi-directional DC-to-AC power converter 114 though AC converter cable 116. When the level of stored energy in energy storage device 112 is inadequate to supply electrical device 110, AC power flows into energy storage device 112 through bi-directional DC-to-AC power converter 114 to charge energy storage device 112. In the case where vehicle 102 is an aircraft, electrical device 110 includes at least one fan motor used for vehicle propulsion during taxiing on a runway.

Figure 2:
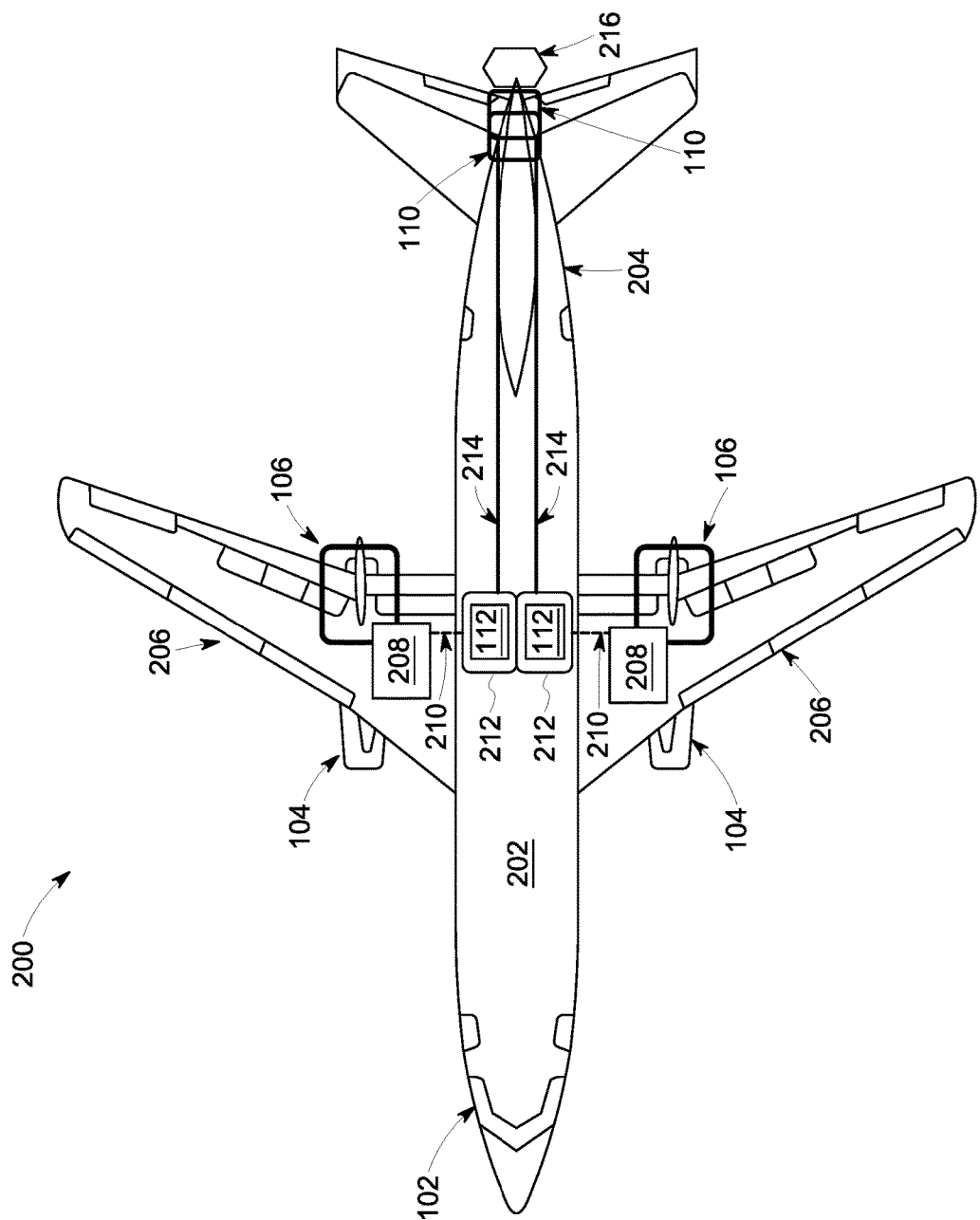
FIG. 2 is a schematic view of an exemplary embodiment of an electric vehicle propulsion system superimposed on a plan view of the aircraft shown in FIG. 1.

FIG. 2 is a schematic view of an exemplary embodiment of an electric vehicle propulsion system superimposed on a plan view of the aircraft shown in FIG. 1. In the exemplary embodiment, vehicle 102 is an aircraft including at least one engine 104 (as shown in FIG. 1). Aircraft includes a fuselage 202 with an aft portion 204 and two wings 206. At least one generator 106 is coupled to at least one engine 104 (as shown in FIG. 1). Also, in the exemplary embodiment, at least one generator rectifier 208 is coupled to vehicle 102 and to generator 106. Generator rectifier 208 is configured to rectify an AC power output of generator 106 and to transmit a DC power on at least one generator cable 210 to at least one battery integrated power converter (BIC) 212. Furthermore, in the exemplary embodiment, generator cable 210 is a DC cable.

Further, in the exemplary embodiment, BIC 212 includes at least one energy storage device 112, including, without limitation, a DC energy storage device such as at least one battery, collocated with BIC 212. Also, in the exemplary embodiment, BIC 212 is configured to function as a DC-to-AC power converter which receives DC power from generator rectifier 208 and transmits AC power to electrical device 110 through at least one BIC cable 214. Further, in the exemplary embodiment, electrical device 110 includes at least one fan motor 216, as shown and described above with reference to FIG. 1.

In operation, in the exemplary embodiment, rectified DC power from generator rectifier 208, either alone or in combination with DC power from energy storage device 112, is converted by BIC 212 to AC power transmitted to electrical device 110. BIC 212 diverts some portion of DC power from generator rectifier 208 to charge energy storage device 112 when energy storage device 112 does not adequately supply power to electrical device 110. In that case, a larger portion of DC power from generator rectifier 208 is converted to AC power by BIC 212 to supply AC power to electrical device 110 than when energy storage device 112 fully supplies AC power to electrical device 110. When energy storage device 112 is fully supplying power to electrical device 110, the mechanical load placed upon engine 104 by generator 106 is lower than when generator rectifier 208 is supplying DC power to one or both of electrical device 110 and energy storage device 112, i.e., for charging. Moreover, in operation of the exemplary embodiment, inclusion of generator rectifier 208 facilitates coupling of DC cable, rather than larger and heavier AC cable, between generator 106 and BIC 212, thus increasing the specific power, i.e., kW/kg, of the exemplary electric vehicle propulsion system 200 relative to the electric vehicle propulsion system 100 shown and described above with reference to FIG. 1.

Figure 3:
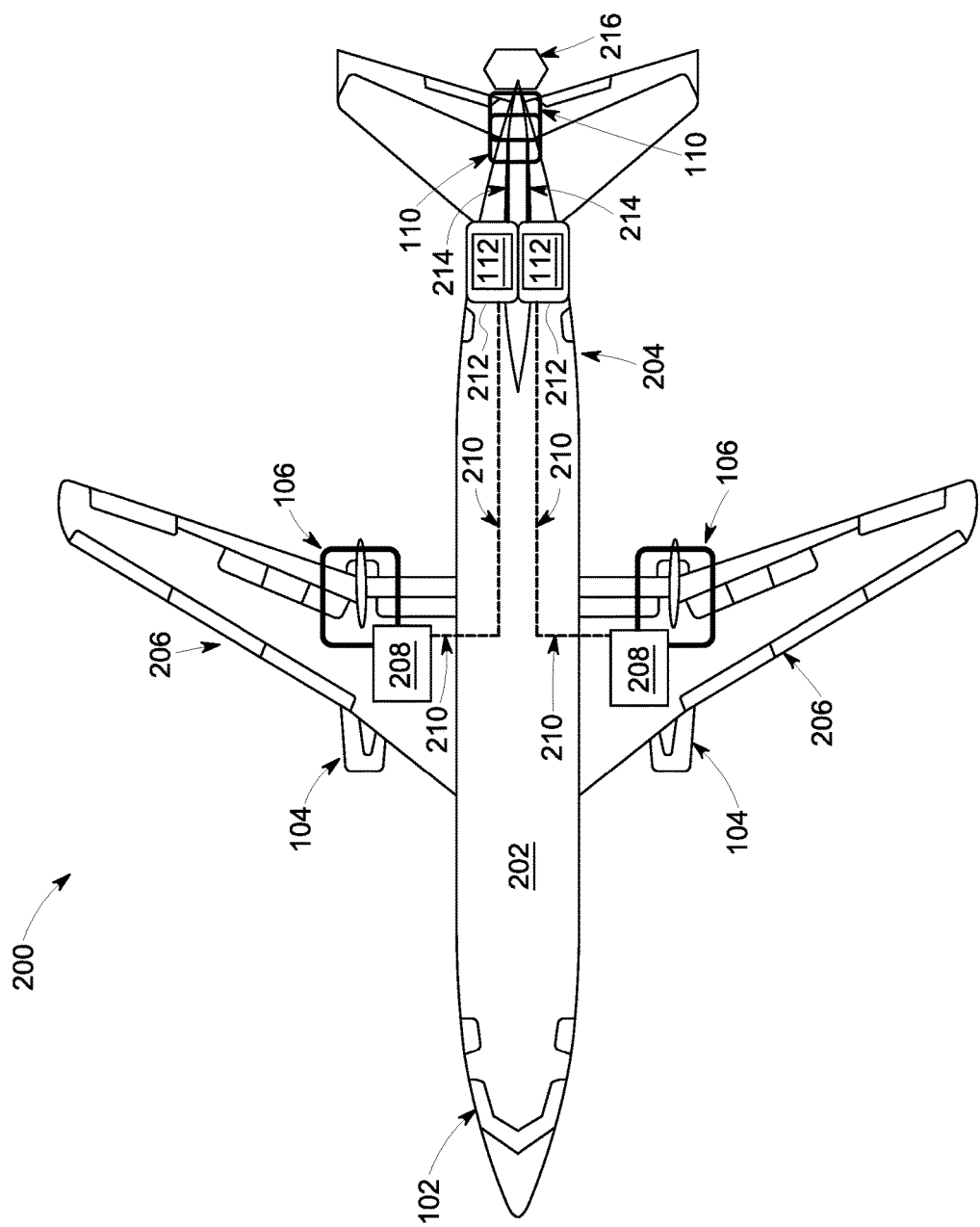
FIG. 3 is a schematic view of an alternative embodiment of an electric vehicle propulsion system superimposed on a plan view of the aircraft shown in FIG. 1.

FIG. 3 is a schematic view of an alternative embodiment of an electric vehicle propulsion system superimposed on a plan view of the aircraft shown in FIG. 1. In this alternative embodiment, generator 106 with generator rectifier 208 transmits DC power to BIC 212 on DC type generator cable 210. Also, in this alternative embodiment, vehicle 102 is an aircraft and BIC 212 is coupled to aft portion 204 of fuselage 202.

In operation, this alternative embodiment functions as described above with reference to FIG. 1, but with the below noted differences and advantages. In the case where vehicle 102 is an aircraft, inclusion of generator rectifier 208 and coupling BIC 212 to aft portion 204 of fuselage 202 facilitates coupling of longer lengths of DC cable, rather than larger and heavier AC cable, between generator 106 and BIC 212, thus increasing the specific power, i.e., kW/kg, of this alternative electric vehicle propulsion system 200 relative to the electric vehicle propulsion system 100 shown and described above with reference to FIG. 1.

Figure 4:
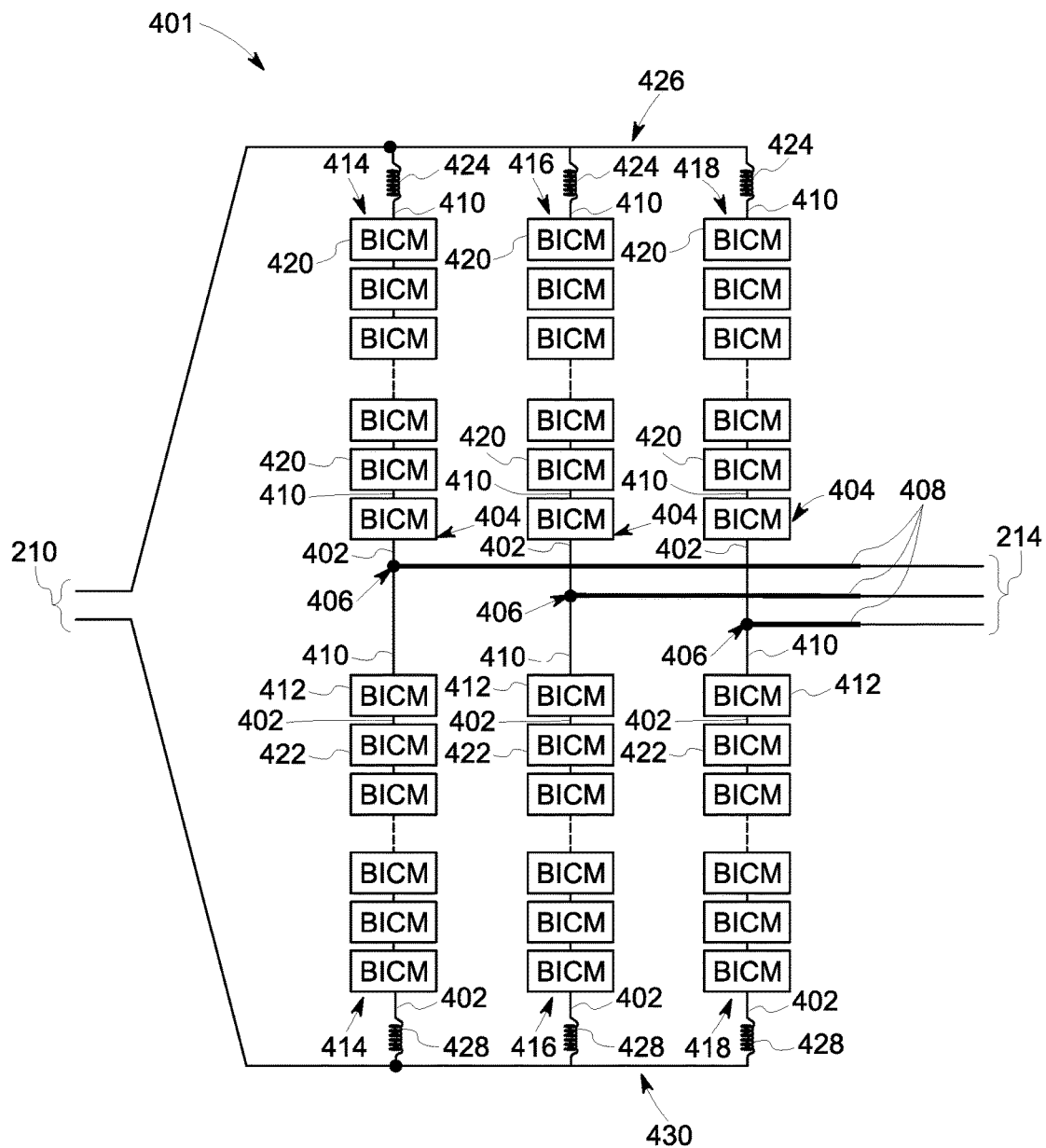
FIG. 4 is a schematic view of an exemplary embodiment of a battery integrated converter (BIC) in a direct current (DC) to alternating current (AC), i.e., DC-to-AC, configuration that may be used with the electric vehicle propulsion system shown in FIGS. 2 and 3.

FIG. 4 is a schematic view of an exemplary embodiment of a BIC 212, i.e., a BIC 401 in a DC-to-AC configuration, including, without limitation, a bi-directional DC-to-AC configuration, that may be used with the electric vehicle propulsion system 200 shown in FIGS. 2 and 3. In the exemplary embodiment, BIC 401 includes a first BICM 404 and a second BICM 412. Second BICM 412 includes a first BICM terminal 410 and first BICM 404 includes a second BICM terminal 402. Also, in the exemplary embodiment, a first BICM terminal 410 of a second BICM 412 is coupled to power terminal 406. A second BICM terminal 402 of a first BICM 404 is also coupled to power terminal 406. Power terminal 406 is configured to receive and/or transmit a phase of AC power 408. Together, serially coupled first BICM 404, power terminal 406, and second BICM 412 form a first string 414. Further, in the exemplary embodiment, a second string 416 and a third string 418 are similarly formed.

Also, in the exemplary embodiment, first string 414, second string 416, and third string 418 are extendable beyond just first BICM 404 and second BICM 412. Second BICM terminal 402 of at least one additional first BICM 420 is serially coupled to first BICM terminal 410 of first BICM 404. First BICM terminal 410 of at least one additional second BICM 422 is serially coupled to second BICM terminal 402 of second BICM 412. Any number of additional first BICMs 420 and additional second BICMs 422 are able to be so coupled to form first string 414, second string 416, and third string 418 of the desired lengths, including, without limitation, with equal numbers of additional first BICMs 420 and additional second BICMs 422.

Further, in the exemplary embodiment, at least one first inductor 424 is coupled to and between first BICM terminals 410 of the last additional first BICMs 420 of first string 414, second string 416, and third string 418, and a first DC node 426. Similarly, in the exemplary embodiment, at least one second inductor 428 is coupled to and between second BICM terminals 402 of the last additional second BICMs 422 of first string 414, second string 416, third string 418, and a second DC node 430. In an alternative embodiment, not shown, at least one first inductor 424 is not coupled to and between first BICM terminals 410 of the last additional first BICMs 420 of first string 414, second string 416, and third string 418, and first DC node 426. Similarly, in another alternative embodiment, not shown, at least one second inductor 428 is not coupled to and between second BICM terminals 402 of last additional second BICMs 422 of first string 414, second string 416, and third string 418, and second DC node 430.

In operation, in the exemplary embodiment, generator cable 210 including a DC cable is coupled to and between generator rectifier 208 (shown in FIGS. 2 and 3), and first DC node 426 and second DC node 430. Power terminals 406 of first string 414, second string 416, and third string 418 transmit three phases of AC power 408 to electrical device 110 (shown in FIGS. 2 and 3), on BIC cable 214 of AC type. Also, in operation of the exemplary embodiment, the degree to which power from energy storage device 112 (shown in FIGS. 2 and 3), is available to supply AC power to electrical device 110, i.e., when generator 106 (shown in FIGS. 2 and 3), is not available, is controllably dependent upon the number of additional first BICMs 404 and additional second BICMs 412 in first string 414, second string 416, and third string 418 in BIC 401. Moreover, in operation of the exemplary embodiment, the modularity of first string 414, second string 416, and third string 418 facilitates use of BIC 401 in a wide variety of electric vehicle propulsion system including, without limitation, those shown and described above with reference to FIGS. 2 and 3.

Figure 5:
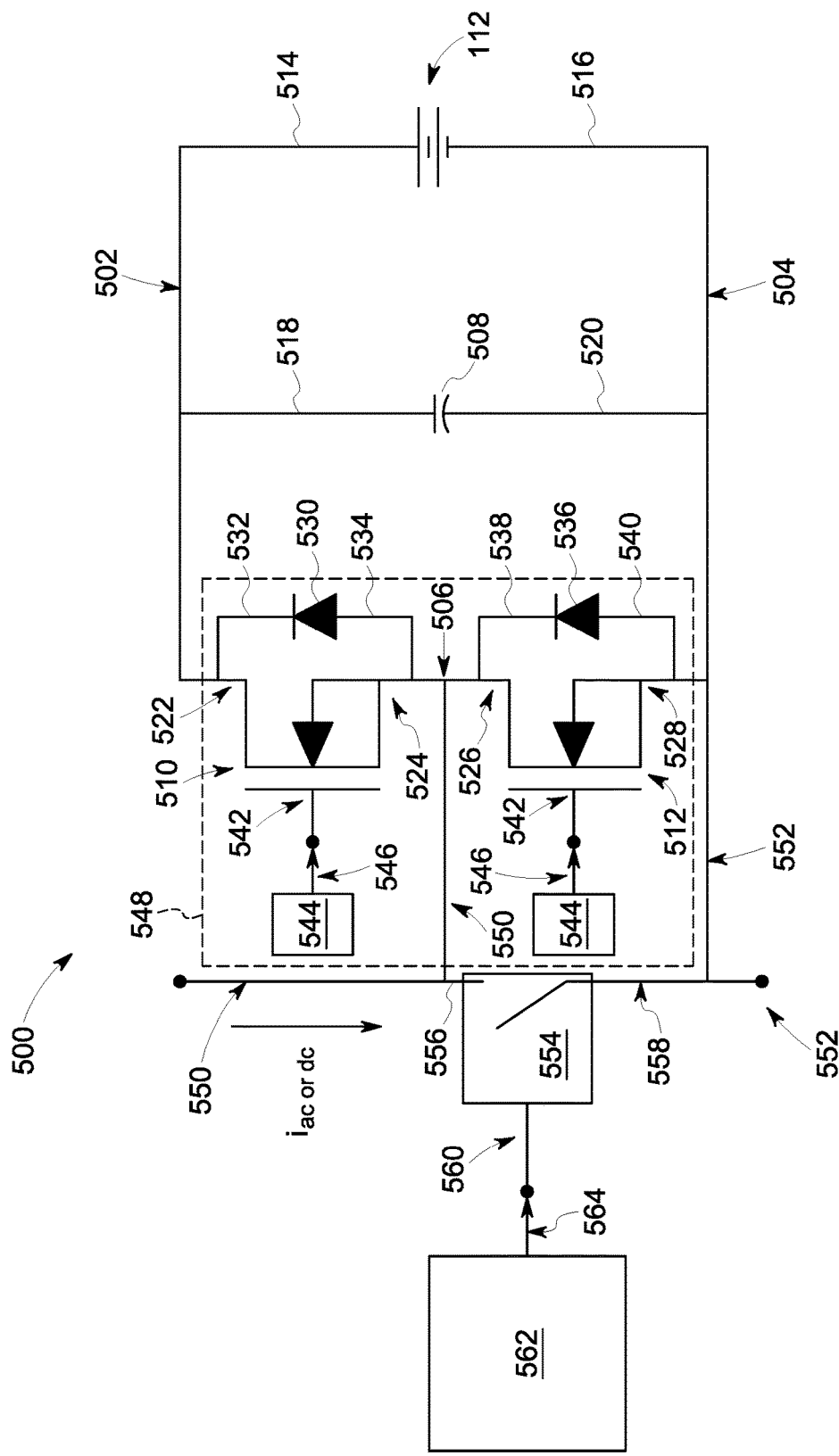
FIG. 5 is a schematic diagram of an exemplary embodiment of a battery integrated converter module (BICM) that may be used in the BIC shown in FIG. 4.

FIG. 5 is a schematic diagram of an exemplary embodiment of a BICM that may be used in the BIC shown in FIG. 4. In the exemplary embodiment, BICM 500 includes a first BICM node 502, a second BICM node 504, and a third BICM node 506 to which are coupled at least one energy storage device 112, at least one capacitor 508, a first switching device 510, and a second switching device 512. Also, in the exemplary embodiment, energy storage device 112, including, without limitation, at least one battery, includes a first terminal 514 coupled to first BICM node 502 and a second terminal 516 coupled to second BICM node 504. Further, in the exemplary embodiment, capacitor 508 includes a first capacitor terminal 518 coupled to first BICM node 502 and a second capacitor terminal 520 coupled to second BICM node 504.

Also, in the exemplary embodiment, first switching device 510 includes a first switch first terminal 522 coupled to first BICM node 502 and a first switch second terminal 524 coupled to third BICM node 506. Further, in the exemplary embodiment, second switching device 512 includes a second switch first terminal 526 coupled to third BICM node 506 and a second switch second terminal 528 coupled to second BICM node 504. First switching device 510 and second switching device 512 include, without limitation, such devices as integrated gate commutated thyristors, non-linear controllable resistors, varistors, and transistors such as insulated-gate bipolar transistors (IGBTs), metal-oxide semiconductor field-effect transistors (MOSFETs), injection enhanced gate transistors, junction gate field-effect transistors (JFETs), bipolar junction transistors (BJTs), and combinations thereof. These devices can be made of Si or wide bandgap materials such as SiC or GaN.

Further, in the exemplary embodiment, first switching device 510 includes a first switch diode 530 including a first cathode 532 coupled to first switch first terminal 522 and a first anode 534 coupled to first switch second terminal 524, i.e., in an antiparallel diode configuration. Also, in the exemplary embodiment, second switching device 512 includes a second switch diode 536 including a second cathode 538 coupled to second switch first terminal 526 and a second anode 540 coupled to second switch second terminal 528. In an alternative embodiment, not shown, first switch diode 530 and/or second switch diode 536 are not so coupled.

Furthermore, in the exemplary embodiment, first switching device 510 and second switching device 512 also include at least a third switch terminal 542 coupled to at least one switching controller 544 configured to transmit at least one switch control signal 546 to at least one switching circuit 548 to control its switching states. Also, in the exemplary embodiment, BICM 500 includes a first BICM terminal 550 coupled to third BICM node 506 and a second BICM terminal 552 coupled to second BICM node 504. In an alternative embodiment, not shown, switching controller 544 receives and transmits other control signals to and from other controllers located elsewhere within or outside BIC 212.

Moreover, in the exemplary embodiment, at least one bypass switch 554 including, without limitation, such devices as non-linear controllable resistors, varistors, and transistors such as IGBTs, MOSFETs, JFETs, BJTs, and relays, is coupled to BIC 212. Bypass switch 554 includes a first bypass terminal 556 coupled to first BICM terminal 550, i.e., third BICM node 506, and a second bypass terminal 558 coupled to second BICM terminal 552, i.e., second BICM node 504. Bypass switch 554 also includes at least a third bypass terminal, i.e., a bypass control terminal 560, coupled to at least one bypass switch controller 562. Bypass switch controller 562 is configured to transmit a control signal 564 to bypass control terminal 560 to close bypass switch 554 when at least one BICM state, including, without limitation, a physical state such as voltage, current, charge, and temperature associated with energy storage device 112, is present. Likewise, bypass switch controller 562 is configured to transmit control signal 564 to bypass control terminal 560 to open bypass switch 554 when at least one BICM state is not present. In an alternative embodiment, not shown, bypass switch 554 and bypass switch controller 562 are not so coupled.

In operation, in the exemplary embodiment, the flow of at least one of an AC current and a DC current in one or the other direction between first BICM terminal 550 and second BICM terminal 552 is controlled via the timing of switching states of switching circuit 548 of BICM 500, as implemented by switching controller 544. As such, switching circuit 548, along with the other aforementioned features and functions of BIC 212, facilitates maintaining a desired charging or discharging state of energy storage device 112 and thereby the proportion of AC and/or DC power supplied to electrical device 110 by generator 106 through BIC 212. Also, in operation of the exemplary embodiment, bypass switch controller coupled to said at least one bypass switch, said at least one bypass switch controller 562 is configured to transmit control signal 564 to close bypass switch 554 when at least one BICM state has a first predetermined value, and open bypass switch 554 when the at least one BICM state has a second predetermined value different from the first predetermined value.

Figure 6:
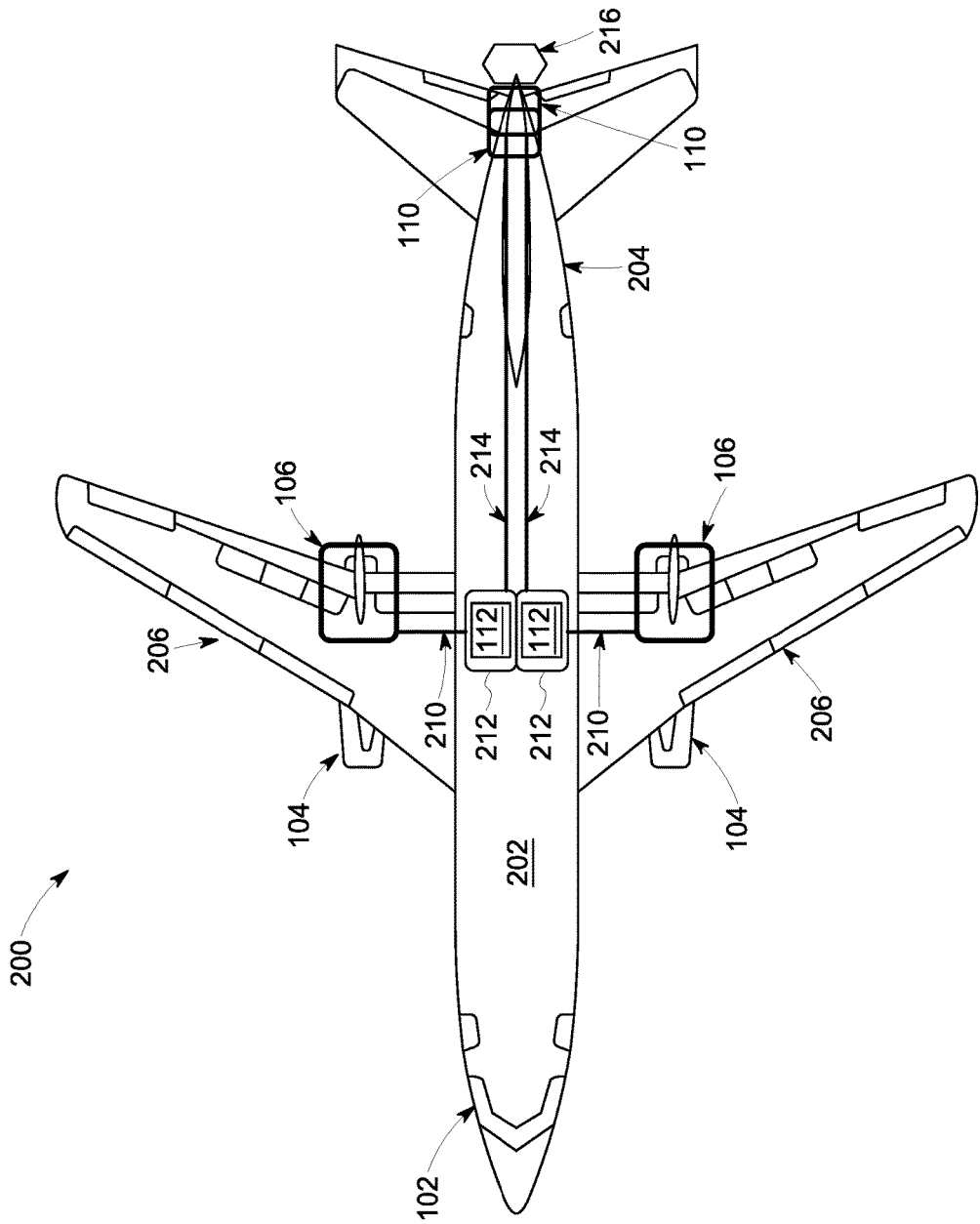
FIG. 6 is a schematic view of another alternative embodiment of an electric vehicle propulsion system superimposed on a plan view of the aircraft shown in FIG. 1.

FIG. 6 is a schematic view of another alternative embodiment of an electric vehicle propulsion system superimposed on a plan view of the aircraft shown in FIG. 1. As shown and described above with reference to FIG. 2, but with noted differences, in this alternative embodiment, generator 106 without generator rectifier 208 transmits AC power to BIC 212 on generator cable 210 of AC type.

In operation, this alternative embodiment functions as described above with reference to FIG. 1, but with the below noted differences and advantages. Also, in operation of this alternative embodiment, in the case where vehicle 102 is an aircraft, not including generator rectifier 208 lowers the weight of electric vehicle propulsion system 200, notwithstanding the presence of heavier AC cable in generator cable 210 and BIC cable 214. Thus, in this alternative embodiment, increasing the specific power, i.e., kW/kg, of electric vehicle propulsion system 200 relative to electric vehicle propulsion system 100 shown and described above with reference to FIG. 1 is possible without inclusion of generator rectifier 208, including, without limitation, in applications where including generator rectifier is infeasible.

Figure 7:
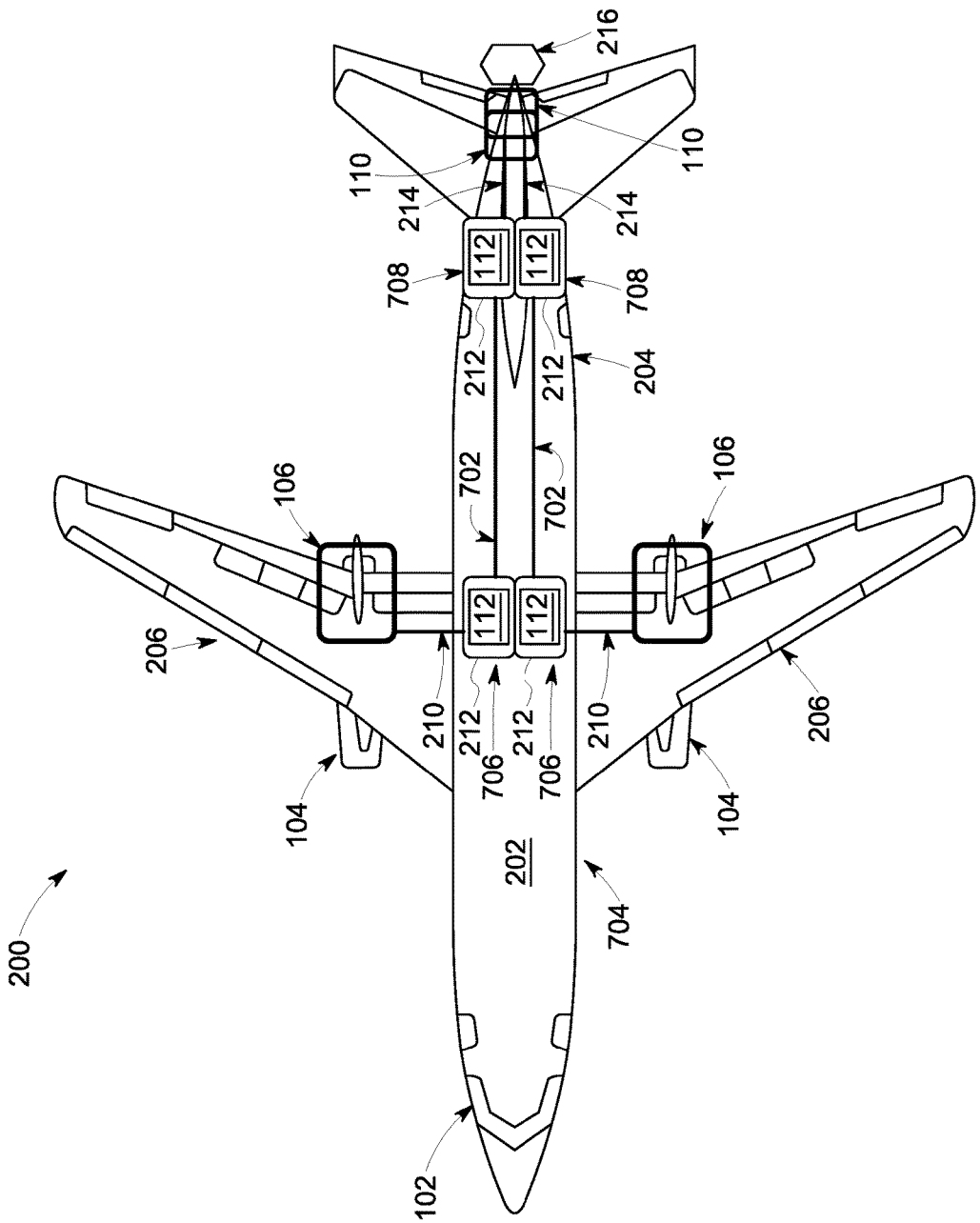
FIG. 7 is a schematic view of yet another alternative embodiment of an electric vehicle propulsion system superimposed on a plan view of the aircraft shown in FIG. 1.

FIG. 7 is a schematic view of yet another alternative embodiment of an electric vehicle propulsion system superimposed on a plan view of the aircraft shown in FIG. 1. As shown and described with reference to FIG. 6, but with noted differences, in this alternative embodiment, generator 106 without generator rectifier 208 transmits AC power to BIC 212 through generator cable 210 of AC type. Also, in this alternative embodiment, BIC 212 further transmits DC power through at least one BIC-to-BIC cable 702 to at least one additional BIC 212 coupled to vehicle 102 at a different location. Further, in this alternative embodiment, in the case where vehicle 102 is an aircraft, for example, at least one BIC 212 is coupled to fuselage 202 of aircraft in a fore portion 704 including, without limitation, proximate to at least one wing 206 of aircraft, i.e., at least one fore BIC 706. Furthermore, in this alternative embodiment, at least one additional BIC 212 is coupled to aft portion 204 of fuselage 202 including, without limitation, proximate to the tail of aircraft, i.e., at least one aft BIC 708. Moreover, in this alternative embodiment, BIC-to-BIC cable 702 of DC type is coupled to and between fore BIC 706 and aft BIC 708, and BIC cable 214 of AC type is coupled to and between aft BIC 708 and electrical device 110.

In operation, this alternative embodiment functions as described above with reference to FIG. 1, but with the below noted differences and advantages. In the case where vehicle 102 is an aircraft, not including generator rectifier 208 in this alternative embodiment lowers the weight of and increases the specific power of electric vehicle propulsion system 200, as described above with reference to FIG. 6. Also, in operation of this alternative embodiment, inclusion of separate fore BIC 706 and aft BIC 708 facilitates replacing longer lengths of bulkier and heavier BIC cable 214 of AC type with lighter weight and smaller BIC-to-BIC cable 702 of DC type. This facilitates further reduction in weight and further increases in specific power in electric vehicle propulsion system relative to electric vehicle propulsion system 100 shown and described above with reference to FIG. 1.

Figure 8:
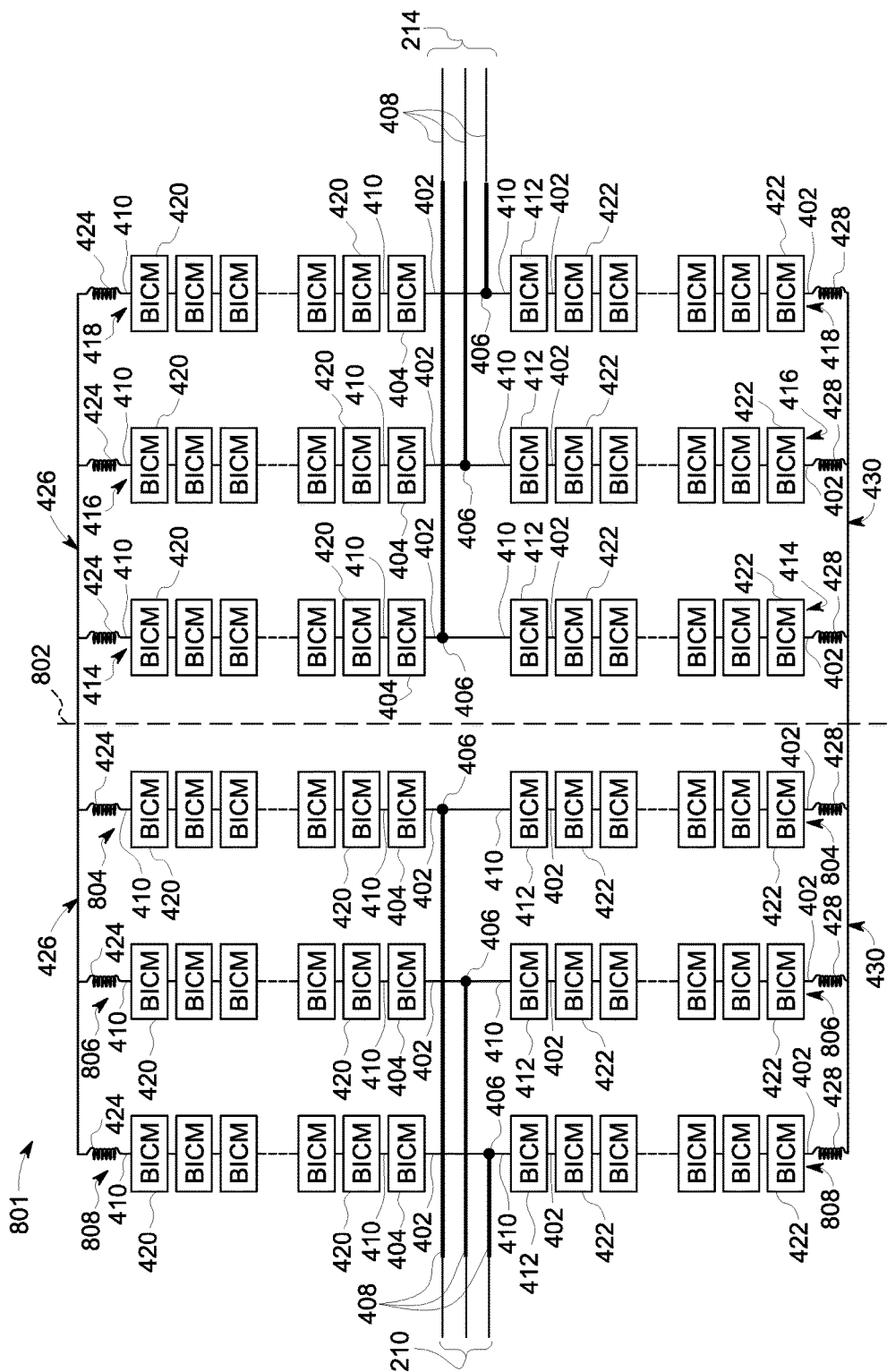
FIG. 8 is a schematic view of an alternative embodiment of a BIC in an AC-to-AC configuration that may be used with the electric vehicle propulsion system shown in FIG. 6.

FIG. 8 is a schematic view of an alternative embodiment of a BIC 212, i.e. a BIC 801 in an AC-to-AC configuration, that may be used with the electric vehicle propulsion system shown in FIG. 6. In this alternative embodiment, BIC 801 includes the BIC 401, as shown and described above with reference to FIG. 4, duplicated and reflected about a centerline 802. As such, in this alternative embodiment, a fourth string 804, a fifth string 806, and a sixth string 808 are added to BIC 801. Fourth string 804, fifth string 806, and sixth string 808 are all coupled to first DC node 426 and second DC node 430 with intervening first inductors 424 and second inductors 428, respectively, as shown and described above with reference to FIG. 4. Thus, in this alternative embodiment, BIC 801 includes six strings. Further, in this alternative embodiment, power terminals 406 of first string 414, second string 416, and third string 418 receive or transmit separate phases of three phase AC power from a source, including, without limitation, generator 106, or to electrical device 110. Furthermore, in this alternative embodiment, power terminals 406 of fourth string 804, fifth string 806, and sixth string 808 receive or transmit separate phases of three phase AC power, i.e., different from those received or transmitted by power terminals 406 of first string 414, second string 416, and third string 418, from a source, including, without limitation, generator 106, or to electrical device 110.

In operation, in this alternative embodiment, generator cable 210 of AC type, i.e., transmitting three phases of AC power, is coupled to and between generator 106 (shown in FIG. 6), and power terminals 406 of either fourth string 804, fifth string 806, and sixth string 808, or first string 414, second string 416, and third string 418. Likewise, in this alternative embodiment, BIC cable 214 of AC type, i.e., transmitting three phases of AC power, is coupled to and between electrical device 110 (shown in FIG. 6), and power terminals 406 of either first string 414, second string 416, and third string 418, or fourth string 804, fifth string 806, and sixth string 808. Also, in operation, in this alternative embodiment, the degree to which power from energy storage device 112 (shown in FIGS. 6 and 7) is available to supply AC power to electrical device 110, i.e., when generator 106 is not available, is controllably dependent upon the number of additional first BICMs 404 and additional second BICMs 412 in first string 414, second string 416, third string 418, fourth string 804, fifth string 806, and sixth string 808 in BIC 801. Moreover, in this alternative embodiment, the modularity of first string 414, second string 416, third string 418, fourth string 804, fifth string 806, and sixth string 808 facilitates use of BIC 801 in a wide variety of electric vehicle propulsion systems 200 including, without limitation, those shown and described above with reference to FIG. 6.

Figure 9:
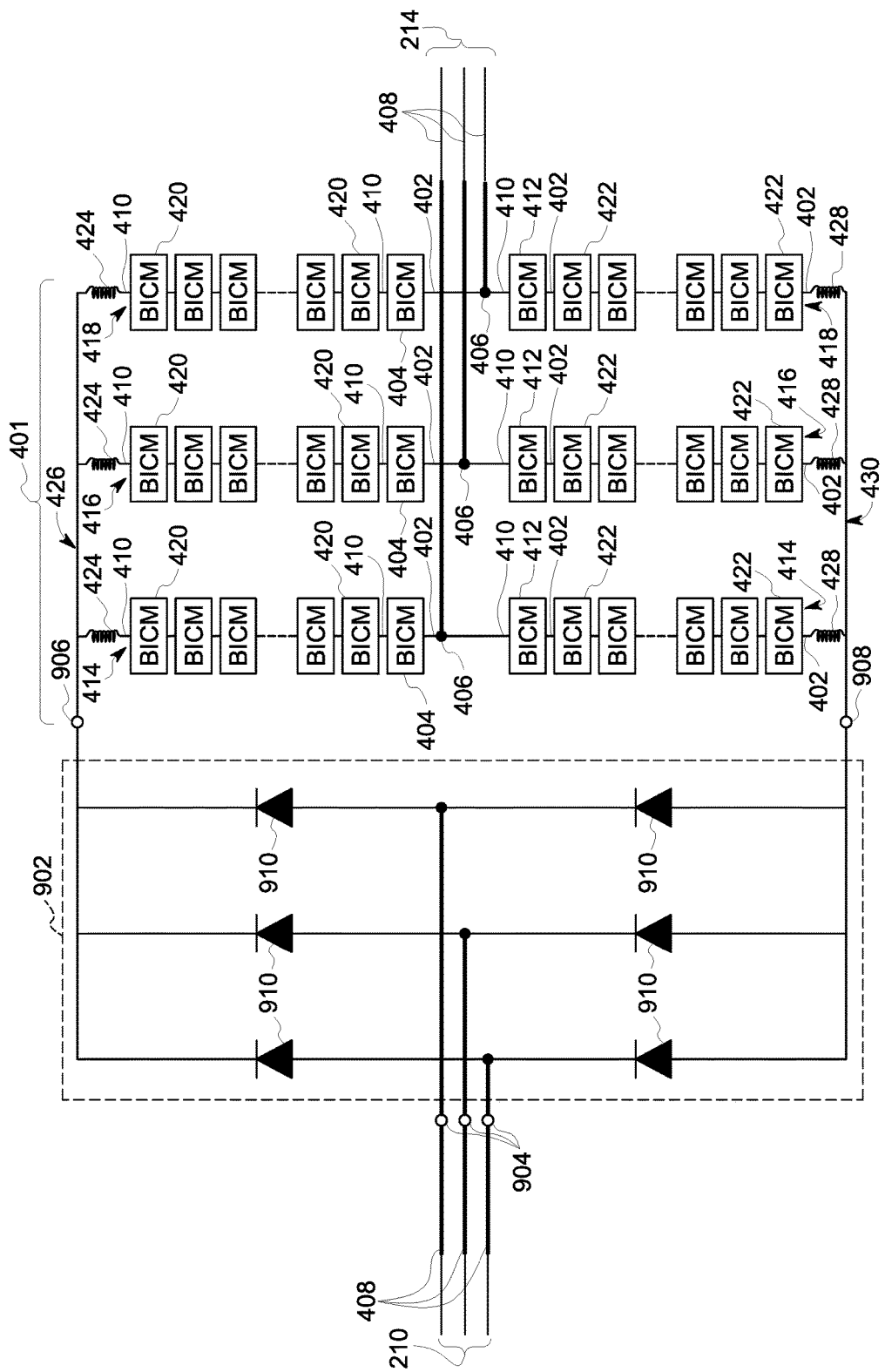
FIG. 9 is a schematic view of another alternative embodiment of a BIC in an AC-to-AC configuration that may be used with the electric vehicle propulsion system shown in FIG. 6.

FIG. 9 is a schematic view of another alternative embodiment of a BIC 212, i.e., BIC 401 in an AC-to-AC configuration, that may be used with the electric vehicle propulsion system shown in FIG. 6. In this alternative embodiment, a rectifier 902, including at least one AC input terminal 904, is configured to receive at least one phase of AC power 408 including, without limitation, AC power transmitted from generator 106 on generator cable 210. Also, in this alternative embodiment, rectifier 902 also includes a first rectifier terminal 906 coupled to first DC node 426, and a second rectifier terminal 908 coupled to second DC node 430. Further, in this alternative embodiment, rectifier 902 includes such rectifiers known in the art including, without limitation, half-wave rectifiers, full-wave rectifiers, bridge rectifiers, rectifiers with at least one diode 910, and rectifiers without at least one diode 910.

In operation, this alternative embodiment functions as described above with reference to FIG. 4, but with the below noted differences. Coupling first rectifier terminal 906 and second rectifier terminal 908 to first DC node 426 and second DC node, respectively, facilitates BIC 401 having a reduced weight and fewer component parts relative to BIC 801 shown and described above with reference to FIG. 8. Rectifier 902 converts phases of AC power 408, i.e., transmitted to AC input terminal 904 on generator cable 210 of AC type, to DC power received by first DC node 426 and second DC node 430 of BIC 401.

Also, in operation, rectifier 902 in this alternative embodiment is configured to perform the same function as generator rectifier 208 shown and described above with reference to FIGS. 2 and 3. It is possible to couple either rectifier 902 or generator rectifier 208 to and between generator 106 and BIC 401. In other alternative embodiments, not shown, first rectifier terminal 906 and second rectifier terminal 908 of rectifier 902 is not coupled directly to first DC node 426 and second DC node 430 of BIC 401. Rather, in such other alternative embodiments, not shown, rectifier 902 is coupled to BIC 401 via a length of DC cable such that BIC 401 and rectifier 902 are not collocated. Similarly, in other alternative embodiments, not shown, rectifier 902 is collocated proximate generator 106 such that rectifier 902 embodies generator rectifier 208, as shown and described above with reference to FIGS. 2 and 3. Thus, in operation of this alternative embodiment, the flexibility in the specific location of rectifier 902 is advantageous in applications of electric vehicle propulsion systems 200 described herein.

Figure 10:
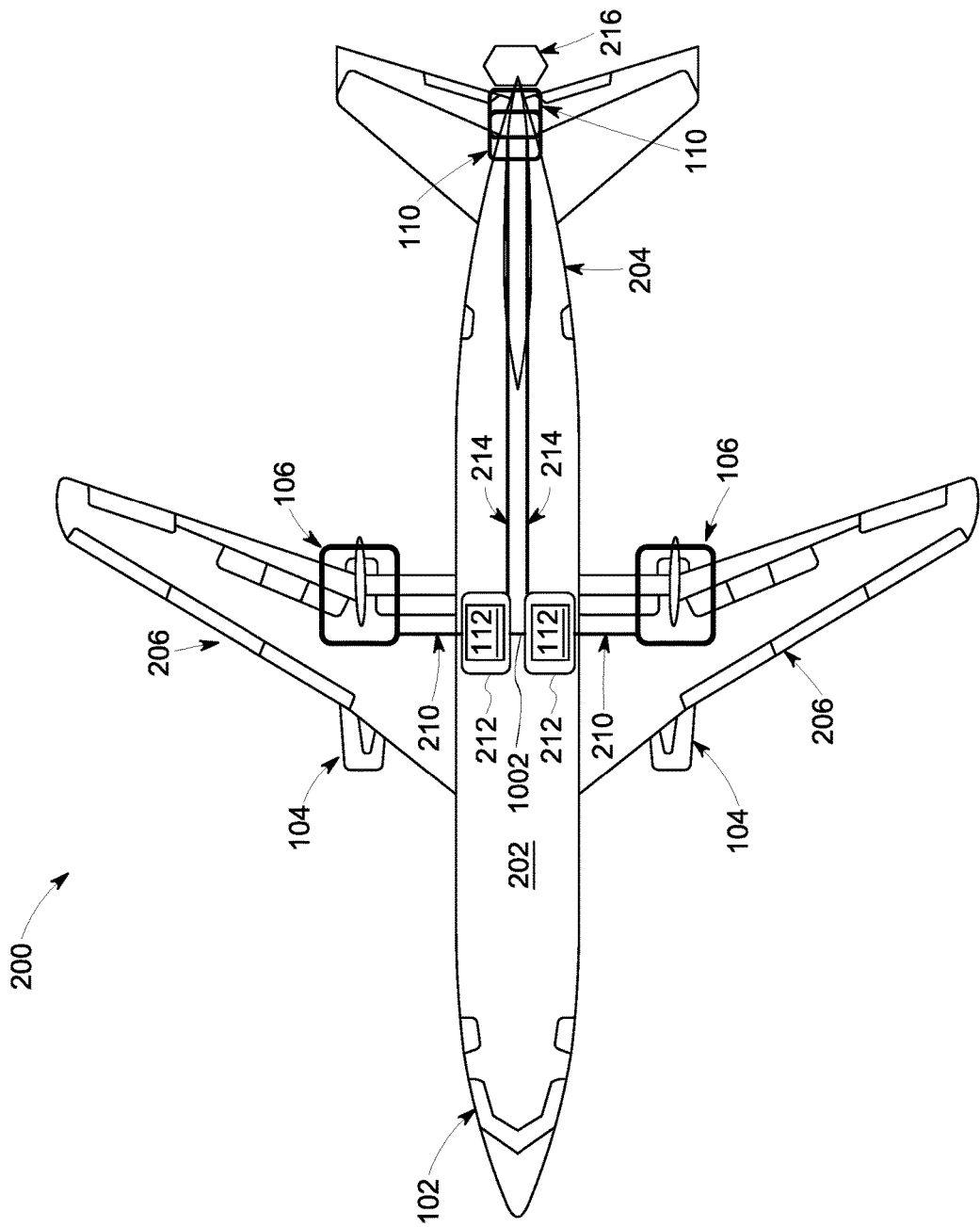
FIG. 10 is a schematic view of another alternative embodiment of an electric vehicle propulsion system superimposed on a plan view of the aircraft shown in FIG. 1.

FIG. 10 is a schematic view of another alternative embodiment of an electric vehicle propulsion system superimposed on a plan view of the aircraft shown in FIG. 1. As shown and described above with reference to FIG. 6, but with noted differences, in this alternative embodiment, generator 106 without generator rectifier 208 transmits AC power to BIC 212 on generator cable 210 of AC type. Also, in this alternative embodiment, there are at least two BICs 212 including a first BIC 212 and a second BIC 212. Further, in this alternative embodiment, at least one DC interconnect 1002 is coupled to and between first BIC 212 and second BIC 212.

In operation, this alternative embodiment functions as described above with reference to FIG. 9, but with the below noted differences and advantages. Also, in operation of this alternative embodiment, DC interconnect 1002 facilitates balancing or sharing the power received by BIC 212 by a power source, including, without limitation, generator 106. Further, in this alternative embodiment, inclusion of at least one DC interconnect 1002 facilitates balancing and sharing the power transmitted by BIC 212 to electrical device 110. As such, in operation of this alternative embodiment, power flow in either direction, i.e., to/from generator 106 and electrical device 110, is more reliable and efficient, which is an important consideration for electrical vehicle propulsion systems including, without limitation, where vehicle 102 is an aircraft. Inclusion DC interconnect 1002 is also advantageous relative to electrical vehicle propulsion systems 100 such as those shown and described above with reference to FIG. 1 because it facilitates continuous operation of electrical device 110 under abnormal operating conditions including, without limitation, situations where at least one of generator 106 and BIC 212 are fully or partially inoperable.

Figure 11:
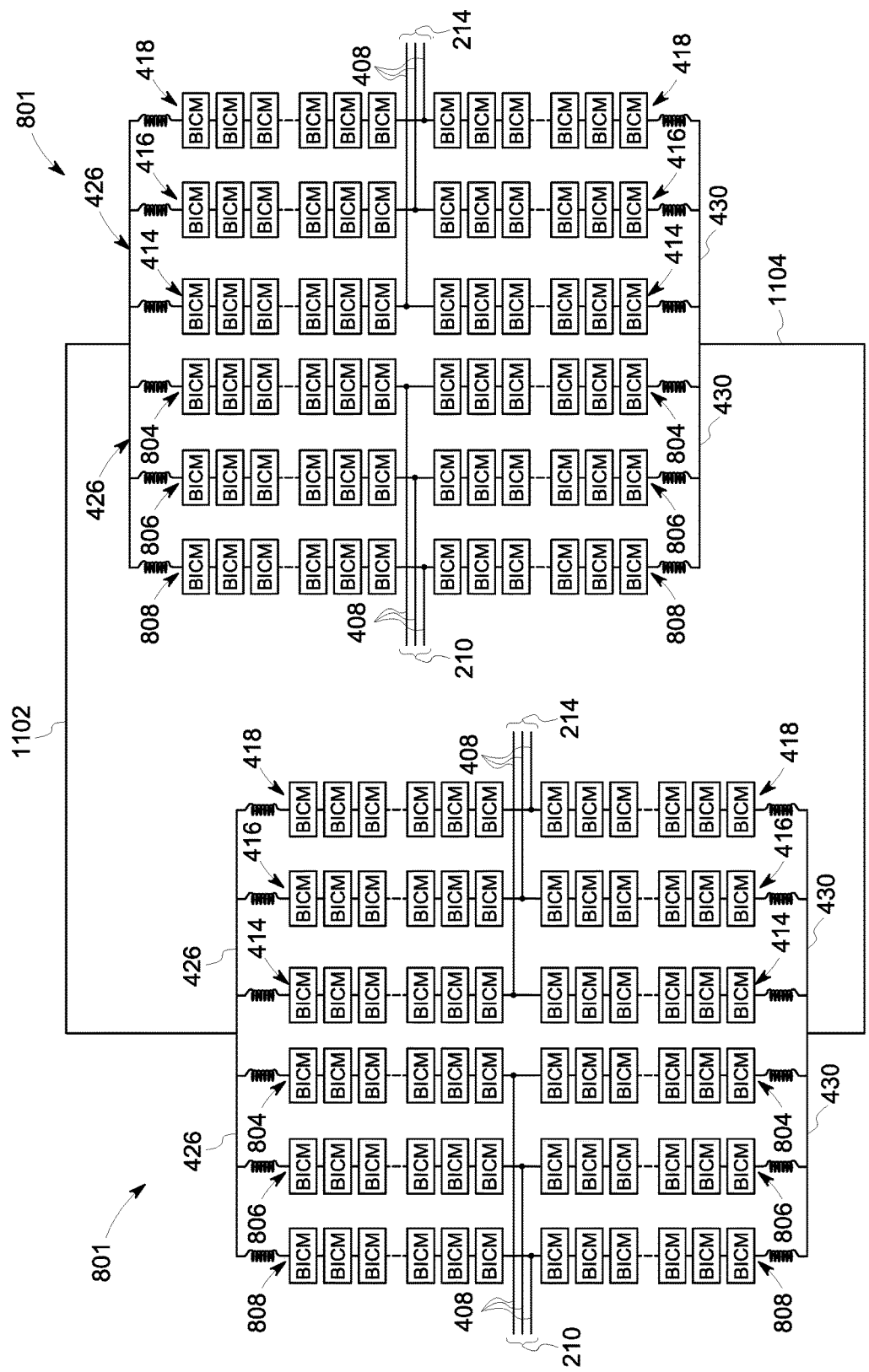
FIG. 11 is a schematic view of yet another alternative embodiment of a BIC in an AC-to-AC configuration that may be used with the electric vehicle propulsion system shown in FIG. 10.

FIG. 11 is a schematic view of yet another alternative embodiment of a BIC, i.e., BIC 801 in an AC-to-AC configuration, that may be used with the electric vehicle propulsion system shown in FIG. 10. In this alternative embodiment, BICs 801 are each as shown and described above with reference to FIG. 8. Also, in this alternative embodiment, a first DC bus 1102 is coupled to and between first DC nodes 426 of a first BIC 801 and a second BIC 801. Further, in this alternative embodiment, a second DC bus 1104 is coupled to and between second DC nodes 430 of first BIC 801 and second BIC 801. Together, first DC bus 1102 and second DC bus 1104 form DC interconnect 1002 as shown and described above with reference to FIG. 10. In other alternative embodiments, not shown, DC interconnect 1002 is not present.

Also, in this alternative embodiment, power terminals 406 of fourth string 804, fifth string 806, and sixth string 808 of first BIC 801 each receive and/or transmit a phase of AC power 408, i.e., transmitted on generator cable 210 from a first generator 106 (shown in FIG. 10). Power terminals 406 of first string 414, second string 416, and third string 418 of first BIC 801 each transmit a phase of AC power 408, i.e., transmitted on BIC cable 214 to a first electrical device 110 (shown in FIG. 10). Further, in this alternative embodiment, power terminals 406 of fourth string 804, fifth string 806, and sixth string 808 of second BIC 801 each receive and/or transmit a phase of AC power 408, i.e., transmitted on generator cable 210 from a second generator 106 (shown in FIG. 10). Power terminals 406 of first string 414, second string 416, and third string 418 of second BIC 801 each transmit a phase of AC power 408, i.e., transmitted on BIC cable 214 to a second electrical device 110 (shown in FIG. 10).

In operation, in this alternative embodiment, including first DC bus 1102 and second DC bus 1104, i.e., DC interconnect 1002, facilitates balancing or sharing the power received by first BIC 801 and second BIC 801 by a power source, including, without limitation, generator 106. Also, in operation of this alternative embodiment, first DC bus 1102 and second DC bus 1104 together facilitate balancing and sharing the power transmitted by first BIC 801 and second BIC 801 to electrical device 110.

Figure 12:
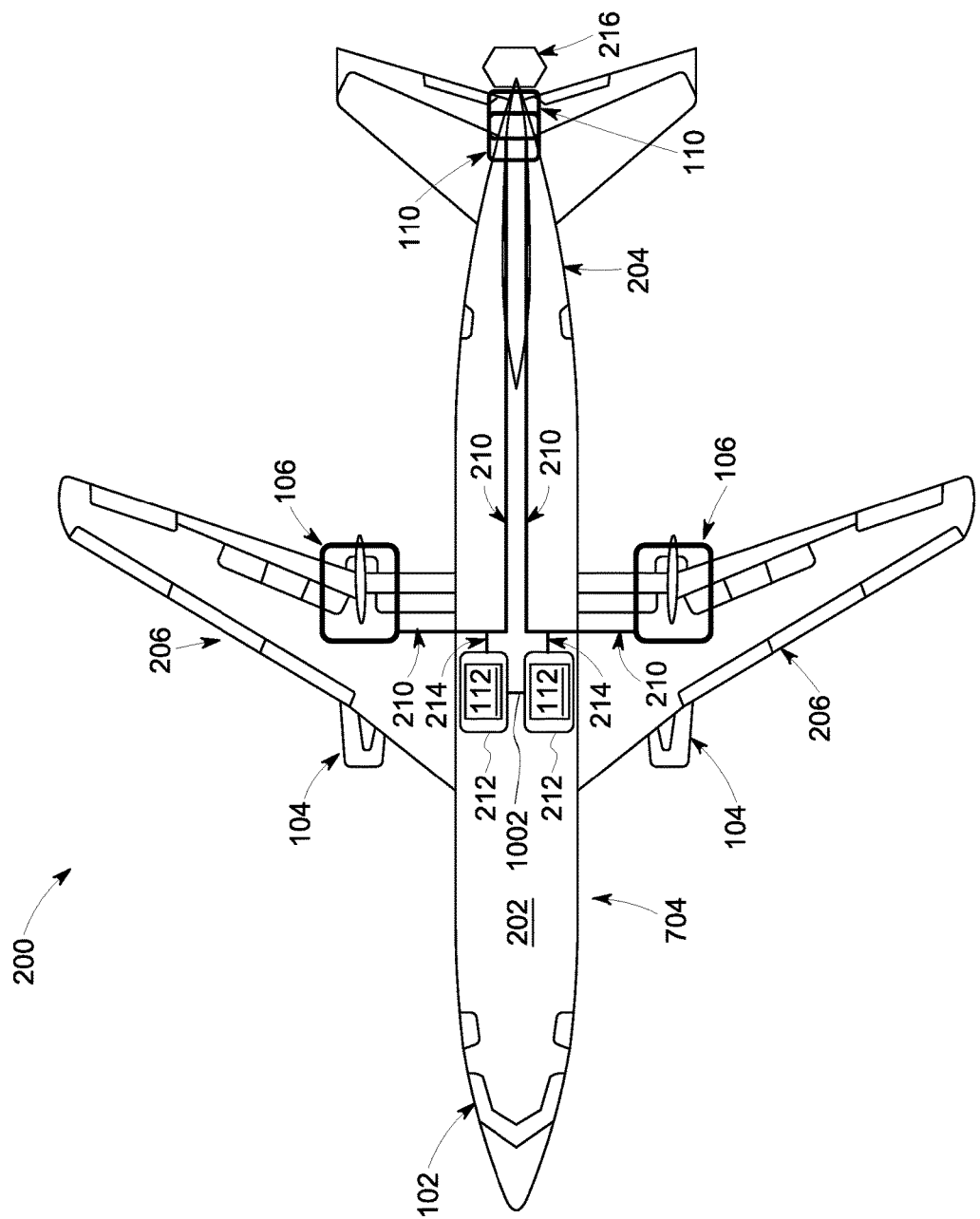
FIG. 12 is a schematic view of yet another alternative embodiment of an electric vehicle propulsion system superimposed on a plan view of the aircraft shown in FIGS. 1.

FIG. 12 is a schematic view of yet another alternative embodiment of an electric vehicle propulsion system superimposed on a plan view of the aircraft shown in FIG. 1, as shown and described above with reference to FIG. 10, but with noted differences. In this alternative embodiment, generator cable 210 of AC type is coupled to and between electrical device 110 and generator 106 without generator rectifier 208. Also, in this alternative embodiment, BIC cable 214 of AC type is coupled to and between BIC 212 and generator cable 210. Further, in this alternative embodiment, there are at least two BICs 212, i.e., a first BIC 212 and a second BIC 212, coupled to fuselage 202 proximate wings 206. In other alternative embodiments, not shown, first BIC 212 and second BIC 212 are coupled to fuselage 202 and to generator cable 210 of AC type at any other location in fuselage 202, including aft portion 204 thereof. Furthermore, in this alternative embodiment, DC interconnect 1002 is coupled to and between the two BICs 212. In other alternative embodiments, not shown, DC interconnect 1002 is not present.

In operation, in this alternative embodiment, it is possible for electrical device 110 to be powered entirely by generator 106 without BIC 212, i.e., in cases where fully powering electrical device 110 with BIC 212 is undesirable or unavailable. Likewise, in operation of this alternative embodiment, it is possible to power electrical device 110 in part by generator 106 and in part by energy storage device 112 in BIC 212, i.e., by discharging energy storage device 112 in BIC 212 in cases where full generating capacity of generator 106 is unavailable or undesirable. Also, in operation of this alternative embodiment, it is possible to fully power electrical device 110 using energy storage device 112 in BIC 212, i.e., by discharging energy storage device 112 in BIC 212 in cases where full generating capacity of generator 106 is unavailable or undesirable. Further, in operation of this alternative embodiment, it is possible to recharge energy storage device 112 in BIC 212 using AC power from generator 106, i.e., in cases where the power demand of electrical device 110 is less than the power output of generator 106.

Also, in operation of this alternative embodiment, in all of the aforementioned operational cases except for the first, it is possible to transmit AC power to and from generator 106, electrical device 110, and BIC 212 via BIC cable 214 coupled to generator cable 210, both of which are AC type cables. Furthermore, in operation of this alternative embodiment, inclusion of DC interconnect 1002 provides additional operations and advantages as described above with reference to FIG. 10.

Figure 13:
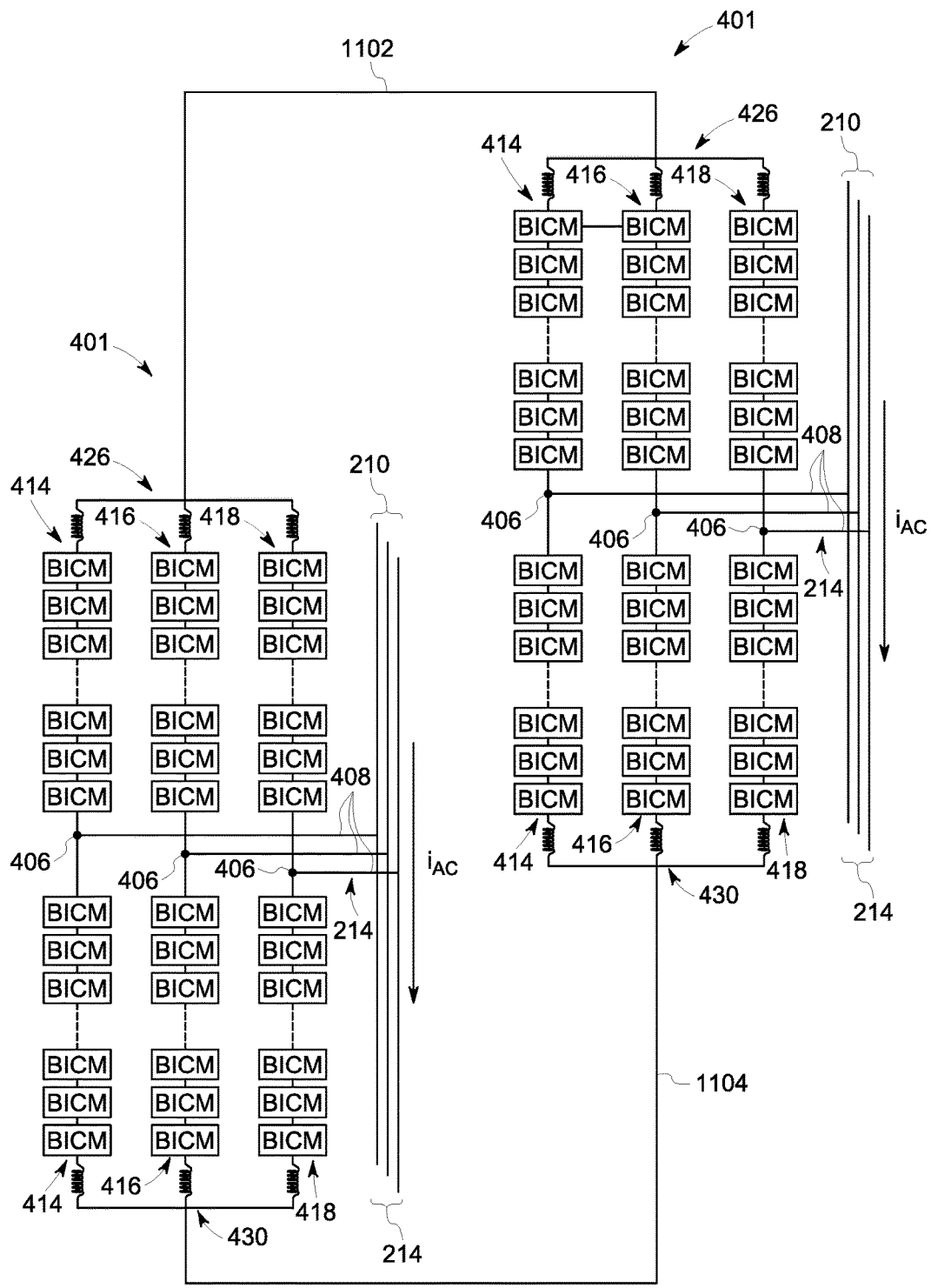
FIG. 13 is a schematic view of yet another alternative embodiment of a BIC in a bidirectional DC-to-AC configuration that may be used with the electric vehicle propulsion system shown in FIG. 12.

FIG. 13 is a schematic view of yet another alternative embodiment of a BIC 212, i.e. BIC 401 in a bidirectional DC-to-AC configuration, that may be used with the electric vehicle propulsion system shown in FIG. 12. In this alternative embodiment, BICs 401 are each as shown and described above with reference to FIG. 4. Also, in this alternative embodiment, in first BIC 401, a first BIC cable 214 of AC type transmits and/or receives three phases of AC power 408 from power terminals 406 of first string 414, second string 416, and third string 418 of BIC 401 to a first generator cable 210 of AC type. Further, in this alternative embodiment, first DC bus 1102 is coupled to and between first DC nodes 426 of the two BICs 401. Furthermore, in this alternative embodiment, second DC bus 1104 is coupled to and between second DC nodes 430 of the two BICs 401. Together, first DC bus 1102 and second DC bus 1104 form DC interconnect 1002 as shown and described above with reference to FIG. 12. In other alternative embodiments, not shown, DC interconnect 1002 is not present.

In operation, in this alternative embodiment, including DC interconnect 1002 including first DC bus 1102 and second DC bus 1104 facilitates balancing or sharing the power received by the two BICs 401 by a power source, including, without limitation, generator 106. Also, in operation of this alternative embodiment, first DC bus 1102 and second DC bus 1104 together facilitate balancing and sharing the power transmitted by the two BICs 401 to electrical device 110.

Also, in operation of this alternative embodiment, coupling of BIC cable 214 of AC type to and between BIC 401 and generator cable 210 AC type facilitates installing BIC 401 in vehicles 102, including, without limitation, aircraft, to recognize many of the aforementioned advantages thereof. Further, in operation of this alternative embodiment, coupling BIC cable 214 of AC type to and between BIC 401 and generator cable 210 of AC type facilitates placement of BIC 401 in numerous locations in vehicle 102 along generator cable 210, including, without limitation, at various locations in fore portion 704 and aft portion 204 of aircraft fuselage 202. Thus, in operation of this alternative embodiment, coupling of BIC 401 to vehicle 102 is adaptable to a wider variety of electric vehicle propulsion systems applications relative to electric vehicle propulsion systems 100 shown and described above with reference to FIG. 1.

The above-described BICs facilitate increasing the specific power, i.e., kilowatt/kilogram (kW/kg), of electric vehicle propulsion systems by reducing the number and weight of passive components and cables. Specifically, the above-described BICs do not require a large number of passive filtering capacitors because the rates of change of voltage with time, i.e., dv/dt, of BICMs are reduced relative to known power converters for electric vehicle propulsion systems. Further, specifically, tight control of dv/dt in individual BICMs results in low levels of harmonic distortion and EMI relative to known power converters for electric vehicle propulsion systems. Further, the above-described BICs are more modular, sealable, reliable, as well as easier to maintain and manufacture relative to known power converters for electric vehicle propulsion systems. Furthermore, a wide variety of energy storage devices are adaptable to use with the above-described BICs, which facilitates incorporation of more advanced energy storage devices into electric vehicle propulsion systems without replacement of power converter components. As such, the above-described BICs utilize energy storage devices to not only provide energy for electric vehicle propulsion, but also to act as voltage sources to enable multi-level power converter operations without additional film capacitors. The above-described BICs also reduce the requirements of using filtering component elements relative to known power converters for electric vehicle propulsion systems.

Exemplary technical effects of the above-described methods, systems, and apparatus include at least one of: (a) increasing the specific power, i.e., kW/kg, of electric vehicle propulsion systems; (b) decreasing the weight of power converter components and cables of electric vehicle propulsion systems; (c) reducing the number and weight of passive components including filtering capacitors in power converter components of electric vehicle propulsion systems; (d) lowering levels of harmonic distortion and EMI in electric vehicle propulsion systems; (e) making power converter components of electric vehicle propulsion systems more modular, sealable, reliable, as well as easier to maintain and manufacture; (f) enabling utilization of energy storage devices in electric vehicle propulsion systems to not only provide energy for electric propulsion, but also to act as voltage sources to enable multi-level power converter operation without additional film capacitors; and (g) facilitating incorporation of more advanced energy storage devices into electric vehicle propulsion systems without replacement of power converter components.

Exemplary embodiments of methods, systems, and apparatus for the above-described BICs are not limited to the specific embodiments described herein, but rather, components of systems and/or steps of the methods may be utilized independently and separately from other components and/or steps described herein. For example, the methods, systems, and apparatus may also be used in combination with other systems requiring increasing the specific power of components of power system components including, without limitation, power converters, generators, motors, cables, and energy storage devices, and the associated methods, and are not limited to practice with only the systems and methods as described herein. Rather, the exemplary embodiments can be implemented and utilized in connection with many other applications, equipment, and systems that may benefit from using BICs to improve the specific power, performance, reliability, power efficiency, EMI behavior, maintainability, and manufacturability of power converters and other power systems in various applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric propulsion system for a vehicle, said electric propulsion system comprising:
    at least one generator;
    at least one drive engine coupled to said at least one generator;
    at least one electrical device;
    at least one battery integrated power converter (BIC), wherein said at least one generator and at least one of said at least one BIC are coupled, and wherein said at least one BIC and said at least one electrical device are coupled;
    wherein said at least one BIC comprises:
        at least one string comprising a plurality of BIC modules (BICMs) coupled to each other wherein each BICM of said plurality of BICMs comprises:
        a first switching device and a second switching device, each of said first switching device and said second switching device comprising an antiparallel diode coupled in parallel thereto;
        a first node defined between said first switching device and said second switching device;
        a second node coupled to said second switching device;
        at least one energy storage device coupled in parallel across said first switching device and said second switching device; and
        at least one bypass switch coupled to and between said first node and said second node.

2. The electric propulsion system for a vehicle in accordance with claim 1, wherein said at least one BIC comprises at least a first BIC and a second BIC, said first BIC and said second BIC comprising a first DC node and a second DC node, said electric propulsion system further comprising:
    a first DC bus coupled to and between said first DC node of said first BIC and said first DC node of said second BIC; and
    a second DC bus coupled to and between said second DC node of said first BIC and said second DC node of said second BIC.

3. The electric propulsion system in accordance with claim 1, wherein said at least one BIC further comprises a first DC node and a second DC node, said electric propulsion system further comprising at least one rectifier comprising at least one AC input terminal, a first rectifier terminal coupled to said first DC node, and a second rectifier terminal coupled to said second DC node, wherein said at least one generator comprises an AC generator, and wherein said electric propulsion system further comprises said at least one AC generator coupled to said at least one AC input terminal.

4. The electric propulsion system in accordance with claim 1, wherein the vehicle is an aircraft, said electric propulsion system further comprising at least one fan coupled to an aft portion of a fuselage of the aircraft proximate a tail of the aircraft, said at least one electrical device comprising at least one motor coupled to the aft portion of the fuselage, said at least one motor configured to rotate said at least one fan in at least one of a clockwise and a counterclockwise direction to facilitate propulsion of the aircraft.

5. The electric propulsion system in accordance with claim 1, wherein the vehicle is an aircraft, said at least one BIC coupled to a fuselage of the aircraft proximate a wing of the aircraft.

6. The electric propulsion system in accordance with claim 1, wherein the vehicle is an aircraft, said at least one BIC coupled to an aft portion of a fuselage of the aircraft.

7. The electric propulsion system in accordance with claim 1, wherein the vehicle is an aircraft, said at least one BIC comprising at least one fore BIC and at least one aft BIC coupled to each other, said electric propulsion system further comprising said at least one fore BIC coupled to a fuselage of the aircraft proximate a wing of the aircraft, and said at least one aft BIC coupled to an aft portion of the fuselage.

8. The electric propulsion system in accordance with claim 1 further comprising at least one generator rectifier coupled to and between said at least one BIC and said at least one generator, said at least one generator comprising an AC generator.

9. The electric propulsion system in accordance with claim 1, wherein said at least one generator comprises at least a first generator and a second generator, said at least one electrical device comprises at least a first electrical device and a second electrical device, said at least one BIC comprises at least a first BIC and a second BIC, said first BIC and said second BIC comprising a first DC node and a second DC node, said electric propulsion system further comprising:
  at least one first generator cable coupled to and between said first generator and said first electrical device, said first BIC coupled to said first generator cable;
  at least one second generator cable coupled to and between said second generator and said second electrical device, said second BIC coupled to said second generator cable;
  a first DC bus coupled to and between said first DC node of said first BIC and said first DC node of said second BIC; and
  a second DC bus coupled to and between said second DC node of said first BIC and said second DC node of said second BIC.

10. The electric propulsion system for a vehicle in accordance with claim 1, wherein each BICM of said plurality of BICMs further comprises at least one capacitor coupled in parallel with said at least one energy storage device.

11. The electric propulsion system for a vehicle in accordance with claim 1, wherein said at least one bypass switch comprises at least one bypass switch controller coupled to said at least one bypass switch, said at least one bypass switch controller configured to transmit a control signal to close said at least one bypass switch when at least one BICM state has a first predetermined value and open said at least one bypass switch when the at least one WM state has a second predetermined value different from the first predetermined value.

12. The electric propulsion system fix a vehicle in accordance with claim 1, wherein said at least one string comprises a plurality of strings, said BIC further comprising a first DC node and a second DC node, said plurality of strings coupled to and between said first DC node and said second DC node.

13. The electric propulsion system for a vehicle in accordance with claim 12, wherein each string of said plurality of strings comprises:
  a power terminal thereon;
  a first plurality of BICMs coupled to and between said power terminal and said first DC node; and
  a second plurality of BICMs coupled to and between said power terminal and said second DC node, wherein the number of BICMs in said first plurality of BICMs equals the number of BICMs in said second plurality of BICMs, and wherein said power terminal is configured to perform at least one of the following:
  receive a phase of alternating current (AC) power; and
  transmit a phase of AC power.

14. The electric propulsion system for a vehicle in accordance with claim 12 further comprising:
  at least one first inductor coupled to and between said first DC node and at least one string of said plurality of strings; and
  at least one second inductor coupled to and between said second DC node and at least one string of said plurality of strings.

15. The electric propulsion system for a vehicle in accordance with claim 12, wherein said plurality of strings comprises:
  a first plurality of strings, wherein each string of said first plurality of strings comprises a power terminal coupled thereon, said power terminal configured to receive a phase of AC power; and
  a second plurality of strings, wherein each string of said second plurality of strings comprises said power terminal coupled thereto, said power terminal configured to transmit a phase of AC power.

16. The electric propulsion system for a vehicle in accordance with claim 12 further comprising a rectifier comprising:
  a first rectifier terminal coupled to said first DC node;
  a second rectifier terminal coupled to said second DC node; and
  at least one AC input terminal wherein a number of said at least one AC input terminals equals the number of said strings of said plurality of strings.

17. An electric propulsion system for a vehicle, said electric propulsion system comprising:
  at least one generator;
  at least one drive engine coupled to said at least one generator;
  at least one electrical device;
  at least one battery integrated power converter (BIC), wherein said at least one generator and at least one of said at least one BIC are coupled, and wherein said at least one BIC and said at least one electrical device are coupled;
  wherein said at least one generator comprises at least a first generator and a second generator, said at least one electrical device comprises at least a first electrical device and a second electrical device, said at least one BIC comprises at least a first BIC and a second BIC, said first BIC and said second BIC comprising a first DC node and a second DC node, said electric propulsion system farther comprising:
  at least one first generator cable coupled to and between said first generator and said first electrical device, said first BIC coupled to said first generator cable;

at least one second generator cable coupled to and between said second generator and said second electrical device, said second BIC coupled to said second generator cable;
a first DC bus coupled to and between said first DC node of said first BIC and said first DC node of said second BIC; and
a second DC bus coupled to and between said second DC node of said first BIC and said second DC node of said second BIC.

* * * * *